(12) United States Patent
Tepper et al.

(10) Patent No.: US 12,545,425 B2
(45) Date of Patent: Feb. 10, 2026

(54) OPTICAL LEVEL GAUGE APPARATUS AND METHOD, LIQUID TANK ASSEMBLY AND VEHICLE EMPLOYING THE SAME

(71) Applicant: Airbus (S.A.S.), Blagnac (FR)

(72) Inventors: Jan Tepper, Taufkirchen (DE); Ricardo Barrios, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 445 days.

(21) Appl. No.: 17/989,901

(22) Filed: Nov. 18, 2022

(65) Prior Publication Data
US 2023/0159182 A1     May 25, 2023

(30) Foreign Application Priority Data
Nov. 19, 2021 (EP) .................................... 21209235

(51) Int. Cl.
*B64D 37/30*     (2006.01)
*B64D 43/00*     (2006.01)
*G01F 23/292*     (2006.01)

(52) U.S. Cl.
CPC ............ *B64D 37/30* (2013.01); *B64D 43/00* (2013.01); *G01F 23/2927* (2013.01)

(58) Field of Classification Search
CPC ..... B64D 37/30; B64D 43/00; G01F 23/2927; G01F 23/292; G01F 23/2928
See application file for complete search history.

(56) References Cited

U.S. PATENT DOCUMENTS

| | | | |
|---|---|---|---|
| 5,973,770 A | 10/1999 | Carter et al. | |
| 7,635,854 B1 * | 12/2009 | Babin | G01F 23/2928 |
| | | | 250/573 |
| 8,159,660 B2 | 4/2012 | Mimeault et al. | |

(Continued)

FOREIGN PATENT DOCUMENTS

| | | | | |
|---|---|---|---|---|
| CN | 1243946 A | * | 2/2000 | .......... B41J 2/17566 |
| CN | 101849167 B | * | 6/2011 | ............. B22D 2/003 |

(Continued)

OTHER PUBLICATIONS

Diller, Dwain, "Refractive Index of Gaseous and Liquid Hydrogen," J. Chem. Phys. 49, 3096, 1968, http://doi.org/10.1063/1.670554.

(Continued)

*Primary Examiner* — Octavia Hollington
(74) *Attorney, Agent, or Firm* — KDW Firm PLLC

(57) ABSTRACT

To improve liquid level gauging inside liquid tanks, especially cryogenic liquid tanks, an apparatus and method for determining the liquid level are provided. A light source emits outgoing light rays that are back reflected or scattered by the tank wall of the liquid tank. The back reflected or scattered incoming light rays are received by a light conducting device, which conducts the incoming light rays towards a sensor device. The sensor device has optical sensors coupled to the light conducting device such that there is a one-two-one relationship between each optical sensor and a specific tank wall portion. Due to the change in the amount of light that is received by the optical sensor after the outgoing light rays were refracted by the liquid surface, the liquid level determining device is capable of determining the liquid level.

20 Claims, 10 Drawing Sheets

(56) References Cited

U.S. PATENT DOCUMENTS

| | | | |
|---|---|---|---|
| 9,074,921 | B1 | 7/2015 | Parker et al. |
| 9,116,029 | B2 * | 8/2015 | Kreitmair-Steck .......................... G01F 23/2845 |
| 10,352,755 | B2 * | 7/2019 | Truong ................ B64D 37/005 |
| 10,371,559 | B2 * | 8/2019 | Truong ............... G01F 23/2927 |
| 2005/0242117 | A1 | 11/2005 | Yoshida et al. |
| 2017/0230635 | A1 | 8/2017 | Zakrezewski et al. |
| 2020/0326224 | A1 * | 10/2020 | Chan .................... G01S 7/4818 |

FOREIGN PATENT DOCUMENTS

| | | |
|---|---|---|
| DE | 10 2017 205981 A1 | 10/2018 |
| DE | 10 2018 200363 B3 | 3/2019 |
| EP | 3054272 B1 * 8/2022 | ........... B64D 37/005 |
| WO | WO-2007142933 A2 * 12/2007 | ............. B67D 7/061 |
| WO | WO 2020/003303 A2 | 1/2020 |

OTHER PUBLICATIONS

Grossle, et al, "Minimal and complete set of descriptors for IR-absorption spectra of liquid H2-D2 mixtures, "AIP Advances 10, 055108, 2020.

European Search Report for U.S. Appl. No. 21/209,235 dated May 12, 2022.

* cited by examiner

OPTICAL LEVEL GAUGE APPARATUS AND METHOD, LIQUID TANK ASSEMBLY AND VEHICLE EMPLOYING THE SAME

TECHNICAL FIELD

The disclosure herein relates to an optical level gauge apparatus and method. Furthermore, the disclosure herein relates to a liquid tank assembly and a vehicle.

BACKGROUND

Many current solutions for level gauging require the sensing element in direct contact with the liquid inside the tank, sometimes even requiring the use of electrical energy inside the tank.

In some cases, the sensing method is based on discrete level measuring points, where e.g. a diode triggers a response once in direct contact to the liquid. This solution requires a high amount of ports, one per each sensing point, increasing the number of cables/ports and harness for high resolution requirements. Consequently maintainability and/or installation is/are affected.

Usual fiber optics sensors also require direct contact with the liquid, as the measuring principle is based on based on changes in one or more optical properties of the fiber along its length. In some arrangements, such as the ones disclosed in U.S. Pat. No. 9,074,921 B1, the fiber is co-installed with a wire cable to heat the liquid and detect the liquid level based on the difference in time needed to cool-off for the wet and dry sections of the fiber.

For these types of approaches using the heat dissipation rate difference between the gas and liquid phase of the hydrogen level some liquid boiling is inevitably created, contributing to the vaporization of the fuel leading to inefficient leakage. For maintenance tasks, many current solutions require emptying the tank to be able to open it and get access to the sensing elements installed inside.

SUMMARY

It is an object of the disclosure herein to improve level gauging inside liquid tanks, preferably in the field of cryogenic liquids.

The object is achieved by the subject-matter and embodiments disclosed herein.

The disclosure herein provides an optical level gauge apparatus configured for gauging a liquid level in a tank volume defined by a tank wall of a tank, the apparatus comprising:
  a light source;
  a sensor device having a plurality of optical sensors, each optical sensor configured for detecting an amount of light, and the sensor device is configured to output a plurality of measured light values that are indicative of the amount of light detected by the respective optical sensor;
  a light conducting device configured to be optically coupled to the light source, the sensor device, and the tank volume, wherein, when optically coupled to the light source, the sensor device, and the tank volume, the light conducting device is capable of conducting outgoing light rays from the light source to the tank volume and incoming light rays, that were reflected or scattered at least once within the tank volume, from the tank volume to the sensor device, and the incoming light rays are conducted in such a manner that each optical sensor corresponds to a specific portion of the tank wall;
  a liquid level determining device configured for determining the liquid level based on the measured light values.

Preferably, the light source is configured to emit one of multi-color light having a plurality of discretely separated wavelengths, visible white light, single wavelength light having visible, ultraviolet or infrared wavelength. Preferably, the light source comprises a laser source.

Preferably, the light conducting device includes an optical output member that is configured to output the outgoing light with a, preferably conical, light ray pattern such that, when optically coupled to the tank volume, the outgoing light is capable of impinging on a tank wall circumferential portion of the tank wall. Preferably, the light conducting device includes an optical input member that, when optically coupled to the tank volume, is configured to receive the incoming light rays after them being reflected or scattered by the tank wall circumferential portion at least once, preferably exactly once.

Preferably, the input member is capable of receiving the incoming light rays after them being reflected or scattered by the tank wall circumferential portion and then subsequently being refracted by a liquid surface in the tank volume.

Preferably, the output member and the input member are combined into an input/output member.

Preferably, the light conducting device includes an outgoing light conductor, the outgoing light conductor being configured for conducting light emitted by the light source towards the tank volume, preferably to the output member.

Preferably, the light conducting device includes an incoming light conductor, the incoming light conductor being configured for conducting light received, preferably by the input member, from the tank volume to the sensor device.

Preferably, the light conducting device includes a bidirectional light conductor configured for conducting the outgoing and incoming light rays to and from the tank volume, preferably by an input/output member.

Preferably, the light conducting device conducts the incoming light rays such that the specific portions are, preferably equidistantly, distributed along the circumferential direction of the tank wall.

Preferably, a first specific portion and a second specific portion that neighbor each other along the circumferential direction of the tank wall are distanced along the longitudinal direction of the tank volume due to a light ray received from the first specific portion being refracted by a liquid level in the tank volume while another light ray received from the second specific portion not being refracted by the liquid level.

Preferably, the light conducting device conducts the incoming light rays such that a first and second group of specific portions are each, preferably equidistantly, distributed along the circumferential direction of the tank wall and are distanced along the longitudinal direction so as to allow measuring a tilt of the tank about a tank tilt axis that is perpendicular to the longitudinal direction, such as a transversal tank axis.

Preferably, the sensor device has an imaging sensor that is formed by the optical sensors, and the sensor device is configured to output the measured light values as image data.

Preferably, the light conducting device is configured as an imaging light conducting device capable of conducting the incoming light rays such that the sensor device is able to image at least a portion of the tank volume, where the outgoing light rays fall, preferably to image the tank volume where outgoing light rays fall.

Preferably, the liquid level determining device is configured to determine the liquid level by processing the image data.

Preferably, the apparatus further comprises a pattern arrangement that is arrangeable within or projectable into the tank volume, wherein the incoming light rays are caused by the pattern arrangement.

Preferably, the pattern arrangement is configured to absorb a first wavelength emitted by the light source and configured to emit a second wavelength that is different from the first wavelength.

Preferably, the pattern arrangement is suitable to reflect the outgoing light rays, thereby generating the incoming light rays.

Preferably, the pattern arrangement comprises at least one stripe that is configured to reflect outgoing light. Preferably, the pattern arrangement comprises two stripes each configured to reflect outgoing light and arranged parallel to each other.

Preferably, the sensor device is configured to detect the second wavelength, but preferably not the first wavelength.

Preferably, the pattern arrangement is illuminatable or projectable by the outgoing light rays such that incoming light rays are only generated a portion of the pattern arrangement that is in the same region above or below the liquid level as the output member.

Preferably, the light source is tunable in wavelength.

Preferably, the sensor device has a spectrometer or spectral camera that is respectively formed by the optical sensors, and the sensor device is configured to output the measured light values as spectral data or spectral image data respectively.

Preferably, the liquid level determining device is configured to control the light source so as to emit at a measurement wavelength, that is determined from the spectral data or the spectral image data and that allows an increase of a signal-to-noise ratio.

The disclosure herein provides a liquid tank assembly, preferably a cryogenic liquid tank assembly, for a vehicle, preferably an aircraft, the liquid tank assembly comprising a tank having a tank wall defining a tank volume for storing a liquid and a preferred optical level gauge apparatus, wherein the light conducting device is optically coupled to the tank volume.

Preferably, the light conducting device is optically coupled to the light source, the sensor device, and the tank volume.

Preferably, the light conducting device is optically coupled such that outgoing light rays are conducted from the light source to the tank volume and incoming light rays, that were reflected or scattered at least once within the tank volume, are conducted from the tank volume to the sensor device.

Preferably, the incoming light rays are conducted in such a manner that each optical sensor corresponds to a specific portion of the tank wall.

Preferably, the light source is configured to emit one of multi-color light having a plurality of discretely separated wavelengths, visible white light, single wavelength light having visible, ultraviolet or infrared wavelength. Preferably, the light source comprises a laser source.

Preferably, an optical output member is disposed outside the tank volume on the tank wall.

Preferably, the output member is optically coupled to the tank volume such that the outgoing light is output with a, preferably conical, light ray pattern such that the outgoing light impinges on a tank wall circumferential portion of the tank wall.

Preferably, an optical input member is disposed outside the tank volume on the tank wall.

Preferably, the light conducting device includes an optical input member that is optically coupled to the tank volume so that incoming light rays are received after them being reflected or scattered by the tank wall circumferential portion at least once, preferably exactly once.

Preferably, the input member receives the incoming light rays after them being reflected or scattered by the tank wall circumferential portion and them subsequently being refracted by a liquid surface in the tank volume.

Preferably, the output member and the input member are combined into an input/output member.

Preferably, the light conducting device includes an outgoing light conductor, the outgoing light conductor being configured for conducting light emitted by the light source towards the tank volume, preferably to the output member.

Preferably, the light conducting device includes an incoming light conductor, the incoming light conductor being configured for conducting light received, preferably by the input member, from the tank volume to the sensor device.

Preferably, the light conducting device includes a bidirectional light conductor configured for conducting the outgoing and incoming light rays to and from the tank volume, preferably by an input/output member.

Preferably, the light conducting device conducts the incoming light rays such that the specific portions are, preferably equidistantly, distributed along the circumferential direction of the tank wall.

Preferably, a first specific portion and a second specific portion that neighbor each other along the circumferential direction of the tank wall are distanced along the longitudinal direction of the tank volume due to a light ray received from the first specific portion being refracted by a liquid level in the tank volume while another light ray received from the second specific portion not being refracted by the liquid level.

Preferably, the light conducting device conducts the incoming light rays such that a first and second group of specific portions are each, preferably equidistantly, distributed along the circumferential direction of the tank wall and are distanced along the longitudinal direction so as to allow measuring a tilt of the tank about a tank tilt axis that is perpendicular to the longitudinal direction, such as a lateral tank axis.

Preferably, the sensor device has an imaging sensor that is formed by the optical sensors, and the sensor device is configured to output the measured light values as image data.

Preferably, the light conducting device is configured as an imaging light conducting device capable of conducting the incoming light rays such that the sensor device is able to image the tank volume.

Preferably, the liquid level determining device is configured to determine the liquid level by processing the image data.

Preferably, the apparatus further comprises a pattern arrangement that is arranged on or projected onto the tank wall, wherein the incoming light rays are caused by the pattern arrangement.

Preferably, the pattern arrangement is arranged on the tank wall. Preferably, the pattern arrangement comprises a material that is configured to absorb a first wavelength emitted by the light source and configured to emit a second wavelength that is different from the second wavelength. Preferably, the material is a fluorescent material.

Preferably, the pattern arrangement is suitable to reflect the outgoing light rays, thereby generating the incoming light rays.

Preferably, the pattern arrangement comprises at least one stripe that is configured to reflect outgoing light. Preferably, the pattern arrangement comprises two stripes each configured to reflect outgoing light and arranged parallel to each other.

Preferably, the sensor device is configured to detect the second wavelength, but preferably not the first wavelength.

Preferably, the pattern arrangement is illuminated or projected by the outgoing light rays such that incoming light rays are only generated for portions of the pattern arrangement that are below the liquid level.

Preferably, the tank wall comprises at least one anti-sloshing baffle that protrudes along a radial tank direction into the tank volume. Preferably, the pattern arrangement is arranged on or projected onto the anti-sloshing baffle.

Preferably, the light source is tunable in wavelength.

Preferably, the sensor device has a spectrometer or spectral camera that is respectively formed by the optical sensors, and the sensor device is configured to output the measured light values as spectral data or spectral image data respectively.

Preferably, the liquid level determining device is configured to control the light source so as to emit at a measurement wavelength, that is determined from the spectral data or the spectral image data and that allows an increase of a signal-to-noise ratio.

The disclosure herein provides a vehicle, preferably an aircraft, having a preferred optical level gauge apparatus or a preferred liquid tank assembly.

The disclosure herein provides an optical level gauge method for gauging a liquid level in a tank volume defined by a tank wall of a tank, the method comprising:
a) with a light conducting device, conducting light rays, that were reflected or scattered at least once within the tank volume, from the tank volume to a sensor device having a plurality of optical sensors, wherein the light rays are conducted in a manner that each optical sensor corresponds to a specific portion of the tank wall;
b) with the sensor device, detecting an amount of light by each optical sensor and outputting a plurality of measured light values that are indicative of the amount of light detected by the respective optical sensor; and
c) with a liquid level determining device, determining the liquid level based on the measured light values.

Preferably, outgoing light rays are being conducted from the light source to the tank volume.

Preferably, incoming light rays, that were reflected or scattered at least once within the tank volume, are being conducted from the tank volume to the sensor device.

Preferably, the incoming light rays are being conducted in such a manner that each optical sensor corresponds to a specific portion of the tank wall.

Preferably, the light source emits one of multi-color light having a plurality of discretely separated wavelengths, visible white light, single wavelength light having visible, ultraviolet or infrared wavelength. Preferably, the light source comprises a laser source that emits outgoing light.

Preferably, the output member outputs outgoing light with a, preferably conical, light ray pattern such that the outgoing light impinges on a tank wall circumferential portion of the tank wall.

Preferably, the light conducting device includes an optical input member that receives incoming light rays after them being reflected or scattered by the tank wall circumferential portion at least once, preferably exactly once.

Preferably, the input member receives the incoming light rays after them being reflected or scattered by the tank wall circumferential portion and them subsequently being refracted by a liquid surface in the tank volume.

Preferably, the light conducting device includes an outgoing light conductor, the outgoing light conductor conducting light emitted by the light source towards the tank volume, preferably to the output member.

Preferably, the light conducting device includes an incoming light conductor, the incoming light conductor conducting light being received, preferably by the input member, from the tank volume to the sensor device.

Preferably, the light conducting device includes a bidirectional light conductor conducting the outgoing and incoming light rays to and from the tank volume, preferably by an input/output member.

Preferably, the light conducting device conducts the incoming light rays such that the specific portions are, preferably equidistantly, distributed along the circumferential direction of the tank wall.

Preferably, a first specific portion and a second specific portion that neighbor each other along the circumferential direction of the tank wall are distanced along the longitudinal direction of the tank volume due to a light ray received from the first specific portion being refracted by a liquid level in the tank volume while another light ray received from the second specific portion not being refracted by the liquid level.

Preferably, the light conducting device conducts the incoming light rays such that a first and second group of specific portions are each, preferably equidistantly, distributed along the circumferential direction of the tank wall and are distanced along the longitudinal direction so as to allow measuring a tilt of the tank about a tank tilt axis that is perpendicular to the longitudinal direction, such as a lateral tank axis.

Preferably, the sensor device has an imaging sensor that is formed by the optical sensors, and the sensor device outputs the measured light values as image data.

Preferably, the light conducting device is configured as an imaging light conducting device that conducts the incoming light rays such that the sensor device is able to image the tank volume.

Preferably, the liquid level determining device determines the liquid level by processing the image data.

Preferably, the apparatus further comprises a pattern arrangement that is arranged on or projected onto the tank wall, wherein the incoming light rays reflected or scattered by the pattern arrangement.

Preferably, the pattern arrangement is arranged on the tank wall and comprises a material that absorbs a first wavelength emitted by the light source and emits a second wavelength that is different from the second wavelength. Preferably, the material is a fluorescent material.

Preferably, the pattern arrangement is suitable to reflect the outgoing light rays, thereby generating the incoming light rays.

Preferably, the pattern arrangement comprises at least one stripe that is configured to reflect outgoing light. Preferably, the pattern arrangement comprises two stripes each configured to reflect outgoing light and arranged parallel to each other.

Preferably, the sensor device detects the second wavelength, but preferably not the first wavelength.

Preferably, the pattern arrangement is illuminated or projected by the outgoing light rays such that incoming light rays are only generated for portions of the pattern arrangement that are below the liquid level.

Preferably, the tank wall comprises at least one anti-sloshing baffle that protrudes along a radial tank direction into the tank volume. Preferably, the pattern arrangement is arranged on or projected onto the anti-sloshing baffle.

Preferably, the light source is tuned in wavelength.

Preferably, the sensor device has a spectrometer or spectral camera that is respectively formed by the optical sensors, and the sensor device outputs the measured light values as spectral data or spectral image data respectively.

Preferably, the liquid level determining device controls the light source so as to emit at a measurement wavelength, that is determined from the spectral data or the spectral image data and that allows an increase of a signal-to-noise ratio.

The disclosure herein provides a computer readable storage medium, a data carrier signal, or a computer program comprising instructions that, upon execution by a computer system operatively coupled to an optical level gauge apparatus, causes the computer system to perform at least one step of a preferred method.

The idea in general relates to the field of optical sensing, and in particular to liquid level measurement inside an enclosed tank or vessel. It is applicable for vehicles of all kinds, specifically aircraft, such as passenger and cargo aircraft as well as urban aerial vehicles. The vehicles are to be equipped to use hydrogen as a fuel with the liquid hydrogen stored in corresponding tanks.

Another aspect of the idea is to achieve an all-optical solution to measure the liquid level inside an enclosed tank/vessel. The examples described rely on transporting light, using a waveguide (e.g. fiber optics cables), to and from the tank. No other type of electromagnetic or electrical energy is required inside the tank.

The preferably all electrically powered equipment for controlling and processing the light to and from the tank can be installed completely outside the tank volume, preferably in a non-pressurized, non-temperature controlled environment. With this current mass produced components, such as laser/light sources, photodetectors, CMOS/CCD camera chips and microcontrollers/microprocessors may be used without hardening them for a cryogenic environment. Furthermore, the ideas disclosed herein offer the potential to reduce installation and maintenance times and costs.

In one embodiment, the fill level of liquid hydrogen (LH2) is determined inside a closed tank/vessel. Electrical energy is avoided inside the tank thereby mitigating fire and explosion risk. Furthermore, the electronics and active components need not withstand the cryostat environment. The sensing solution allows for maintenance without the need to open the tank. A preferred tank shape is a cylinder. It should be noted that other shapes are possible. Under nominal position, the tank Z-axis (height) is parallel to the ground.

One principle used in the disclosed ideas is that LH2 has different absorption spectra and a different index of refraction (IOR) compared to gaseous hydrogen (GH2). These are known, for example, from Grossle et al. "Minimal and complete set of descriptors for IR-absorption spectra of liquid H2-D2 mixtures", AIP Advances 10, 055108 (2020) (https://doi.org/10.1063/1.5111000) and Diller "Refractive Index of Gaseous and Liquid Hydrogen", J. Chem. Phys. 49, 3096 (1968) (https://doi.org/10.1063/1.1670554).

The apparatuses and methods described herein are applicable to basically any liquid that exhibits at least one absorption band in the optical frequencies of the electromagnetic spectrum (i.e. UV, VIS, IR), and/or an IOR of the liquid phase that is different from that in the gas phase.

In one embodiment the measurement system comprises a light source (e.g. a laser) that is guided through an optical fiber bundle, a photodetector system to sense light, a microprocessor to apply signal processing techniques and algorithms, and a fiber bundle having N fibers which are organized in an arrangement, preferably in combination with an optical element (lens, prism, grating, or other), that allows to transmit light rays inside the tank towards the tank side walls.

One end of the fiber bundle (preferably, where the optical element is to be installed) may be located at the center with respect to the tank base, for a symmetrical scenario. Other positions are possible, but accounting for the changed geometrical scenario is required by corresponding programming of the microprocessor.

Light rays launched into the tank from the fiber bundle, preferably the optical element, travel towards the tank walls. A certain amount of light is back reflected or scattered and coupled back into the fiber bundle by the optical element, for example.

The tank walls can be coated, machined, or modified in a way, in order to maximize its scattering response in the back direction. It is also possible to install an element inside the tank that can be using a backreflection surface, with an appropriate material, shape and/or coating. This element can be simultaneously used, for example, as an anti-sloshing baffle or be disposed on an anti-sloshing baffle. If the outgoing light ray crosses the LH2 interface, the ray is refracted. The laser source can be tuned to a wavelength with an appropriate attenuation coefficient which allows to observe a different total path absorption that is sufficient to apply signal processing techniques (e.g. denoising, curve fitting, gradient, etc.) to the measured light values. All subsystems may be located externally from the tank, and thus no electrical energy is required to be sent into the tank.

If the optical design is such that the angle of the outgoing rays with the surface of the liquid is so that total internal reflection occurs when the fiber bundle output is located below the liquids surface, the method still can determine the liquid level provided the algorithm for the microprocessor is adapted. The level then can be inferred from the highest measuring point from which a reflection can still be measured.

In order to improve the results of the signal processing, the light source should be capable of being tuned to a wavelength with an appropriate attenuation coefficient, which preferably allows to observe a difference in the total path absorption between light rays traveling only through liquid, only through gas, or partially traveling through liquid and gas.

In another embodiment the measurement system comprises an illumination source, e.g. visible white light, single lambda ultraviolet, visible or infrared, a camera compatible with the spectrum of the light source, a microprocessor to apply image processing techniques and algorithms, and an imaging fiber bundle which transmits passively an image from the inside of the tank. The fiber bundle may have an additional arrangement to transport the light from the light source into the tank, or be a separate fiber arrangement running in parallel. Some optics element allowing the distribution of light inside the tank, and the collection of images providing a certain field of view may be attached to the fiber bundle. The inside of the tank can be illuminated by light generated by the light source and transported inside the tank through the fiber bundle. The image of the illuminated scene can be passively transmitted, through the fiber bundle to a camera outside the tank. The tank wall may be painted/coated with a pattern that facilitates image processing tasks. The pattern may also be painted on other elements inside the tank, e.g. anti-sloshing baffles. The received image is processed by the microprocessor using image processing algorithms.

The information on the liquid level can be obtained from the recorded images and applying image processing techniques for preferably edge detection and feature extraction. In addition, an image with the tank empty can be used for reference, to detect any deviation with images taken at different fill levels. The recorded images may also aid in general tank inspection, e.g. leakage detection, corrosion detection. The pattern may also exhibit a spatially varying reflectance spectrum which can aid the signal processing.

Preferably, a spectrometer is added to the system.

Light rays that cross the gas-liquid interface may be refracted randomly by the liquid's surface and therefore lead to blurring, which may aid the signal processing. The method is applicable as long as there is a difference between the IOR of the liquid and gas phase of the substance being sensed.

Assuming that the liquid's IOR is about 1.08 while the gas phase IOR is about unity, the difference is sufficient to register a detectable discontinuity in the reference pattern, which allows for the detection of the liquid interface. The detection of the liquid interface of the substance being sensed may not only be detected due to a discontinuity, i.e. due to refraction. It is also possible to dye the liquid so that it exhibits a color contrast against the reference pattern. In this case, the level extraction can be obtained through detection of the boundary edges where there is a color change in the reference pattern.

The reference pattern can be painted on inside the tank or baffles, or can be generated from the outside and projected into the tank using the same passive image transmission fiber bundle technology used for image acquisition. The actively generated pattern functionality may be performed by an illumination source that is passed through a screen element (by reflection or transmission) with the desired pattern, or an active device, such as a spatial light modulator (SLM) or digital micromirror device (DMD), that can generate structured light with the desired pattern.

In case of an externally generated pattern, a dedicated imaging fiber bundle cable may be employed to transport the structured light into the tank. This fiber bundle is preferably separate from the one used to transmit images out of the tank.

Similarly this method may infer the liquid level from pattern recognition using a camera. The rear wall may be configured non-reflective, except for some (e.g. two) stripes. The stripes are arranged so as to detect yaw and to cover the tank from bottom to top with inclined strips. An optical system, e.g. realized by cylindrical lenses, may project two lines precisely onto the reflective stripes when the tank is full. When the tank level decreases, a change in the received pattern occurs for the rays above the surface liquid. As a result, less power will be received on the expected pixel because the illumination does not hit the stripe due to refraction. This effect will increase as the surface normal is not flat due vibration, i.e. rays that cross the surface will further be refracted randomly.

The aforementioned methods may be extended by using spectral analysis in order to further improve the level sensing and/or retrieve further properties of the liquid such as temperature and/or pressure. In one implementation, the measuring points may reflect only certain wavelengths. Preferably, using a white light source and a spectrometer added to the external unit, this may aid in determining the measuring point number.

In another implementation, a tunable laser source may be used in order to tune the wavelength to a specific point in the absorption spectrum of the medium and thereby improve total path absorption and signal-to-noise-ratio.

In yet another implementation, the tank walls may be colored, which may aid pattern recognition, preferably if used in conjunction with a spectral camera.

Regarding measurement of temperature and/or pressure, the absorption bands of the liquid shift depending on temperature and pressure. By using a white light source and a spectrometer or a tunable laser and a photodiode, the absorption spectrum can be recorded.

For all methods presented the end of the fiber bundle that is attached to the tank can be located outside the tank vessel containing the liquid behind a sealed optical window, or be inside the tank using a feed through tube installation with a sealed optical window termination. The required fiber bundle may be built in a flexible, rigid or semi-rigid assembly. Likewise, if a feedthrough protective tube is used to guide the fiber bundle this could have bending points, when the fiber bundle assembly is rigid or semi-rigid.

For installation/deinstallation purposes, the fiber bundle may be guided to its final position by sliding it inside a feedthrough, and/or guiding tube that is terminated in the necessary optical window. To guarantee correct alignment, a magnetic alignment flange may be installed at the end of the fiber bundle. On the other hand, the fiber bundle cable may be terminated with a magnetic alignment ring that directly mates with a counterpart.

In order to ensure a unique orientation in its final installation position, the magnetic alignment elements may be built with a non-symmetrical profile and/or built with non-symmetrical alternating North and South pole sections.

The magnetic properties advantageously prevent any misalignment during the expected operational environment, in particular with respect to vibrations, but should allow for the complete fiber bundle cable assembly to be slid out by a reasonable amount of pull force applied by an operator, either by direct pulling or by using an appropriate tool.

This will allow for easy installation and maintenance of the complete sensing apparatus. The only element, if damaged, that would require a major maintenance effort is the optical window and its bonding material/resin. Any other mechanical design that allows for precise alignment may be used.

In one embodiment, accuracy may be increased by assistance of an additional inertial measurement unit (IMU) that provides attitude information about the tank position in real time, e.g. information on roll/pitch/yaw.

The achievable resolution is directly related to the amount of rays being launched inside the tank. For example, for a given vertical resolution $\Delta d$ the number of rays is given by $N=2D/\Delta d$, where D is the tank base diameter. For typical measurements of $D=100$ cm and $\Delta d=0.5$ cm about $N=400$ rays are required. The required number of rays can be relaxed, if an appropriate signal processing algorithm is used.

In imaging, the achievable resolution depends on the amount of fiber cores that can be put together in the imaging fiber optics bundle core, the field of view offered by the optics element, and the size of the reference pattern features. Assuming D=100 cm, and imagining the full tank base area through a properly dimensioned optics element then the imaging fiber bundle requires about 360,000 fiber cores (i.e. 600×600) to cover with 3 pixels a target resolution of Δd=0.5 cm.

It should be noted that while the disclosure herein is described with reference to discrete light rays, this is merely an idealization for the sake of explaining the disclosure herein. In other words, the term light ray should be understood to include continuous configurations such as a continuous ring of light.

BRIEF DESCRIPTION OF THE DRAWINGS

Embodiments of the disclosure herein are described in more detail with reference to the accompanying schematic drawings that are listed below.

DETAILED DESCRIPTION

Figure 1:
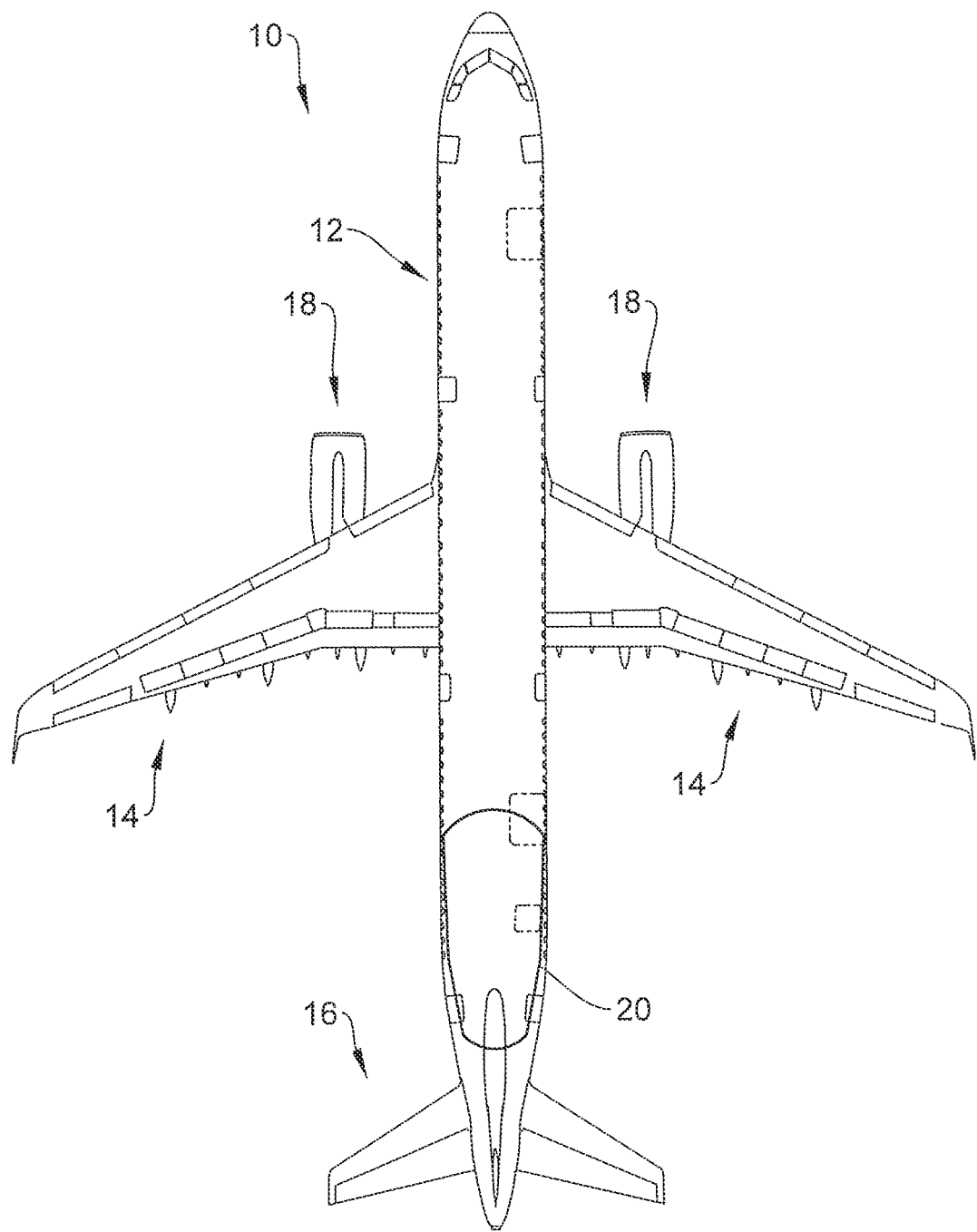
FIG. 1 depicts an embodiment of an aircraft.

FIG. 1 depicts an aircraft 10. The aircraft 10 comprises a fuselage 12. A pair of wings 14 is attached to the fuselage 12. The aircraft 10 also comprises a tail plane section 16. The tail plane section 16 includes a horizontal and vertical tail plane. In addition, the aircraft comprises at least one engine 18 to propel the aircraft 10. The engines 18 are suitable to use hydrogen as fuel.

The aircraft 10 comprises a liquid tank assembly 20. The liquid tank assembly 20 is fluidly coupled to the engines 18 for supplying the engines 18 with fuel. The liquid tank assembly 20 is configured for storing cryogenic liquids, such as liquid hydrogen (LH2), at the corresponding cryogenic temperatures and, as the case may be, under pressure.

Figure 2:
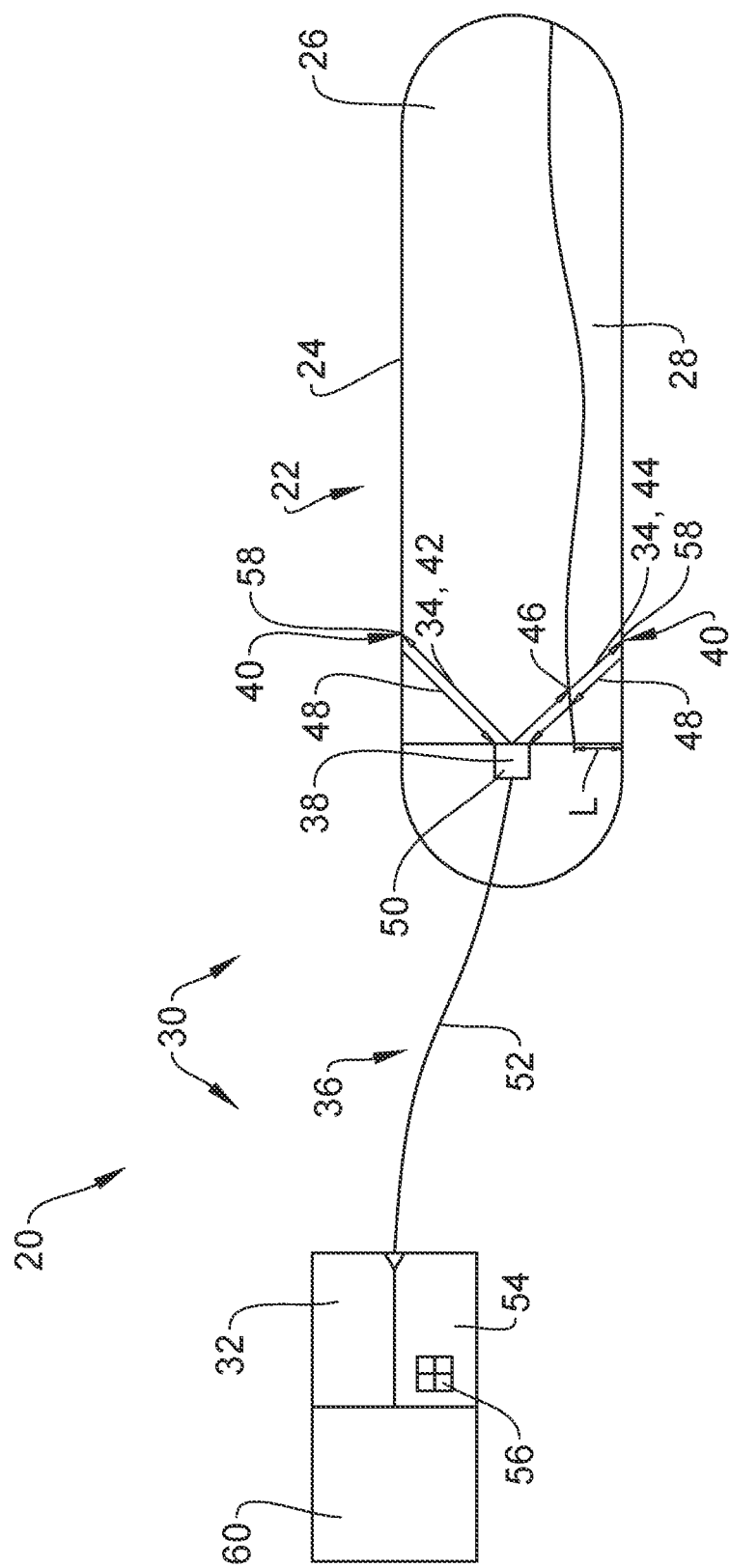
FIG. 2 depicts an embodiment of a tank.

FIG. 2 depicts the liquid tank assembly 20 in more detail. The liquid tank assembly 20 comprises a liquid tank 22. The liquid tank 22 has a tank wall 24 that encloses a tank volume 26 for storing a cryogenic liquid 28. The cryogenic liquid 28 has a liquid level L within the tank volume 26.

The liquid level L is to be gauged by an optical level gauge apparatus 30. The optical level gauge apparatus 30 comprises a light source 32. The light source 32 emits at least one outgoing light ray 34. The outgoing light ray 34 may have a specific wavelength A. The light source 32 is a laser source, for example.

The optical level gauge apparatus 30 further comprises a light conducting device 36. The light conducting device 36 may be configured as a fibre optic cable or a fiber bundle. The light conducting device 36 is optically coupled to the tank volume 26, so as to conduct the outgoing light ray 34 from the light source 32 into the tank volume 26.

The light conducting device 36 may comprise an output member 38. The output member 38 may comprise optical elements, such as a lens, a prism, a polarizer and the like. Preferably the output member 38 is configured to launch a plurality of the outgoing light rays 34 into the tank volume 26 towards a tank wall circumferential portion 40 of the tank wall 24.

In one embodiment not depicted in detail, the light source 32 is configured to emit two different discrete wavelengths λ1, λ2. The output member 38 may be configured such that outgoing light rays 34 having different wavelengths λ1, λ2 impinge on different tank wall circumferential portions 40 that are spaced apart along the tank longitudinal axis. With this configuration, it is possible to detect pitching of the liquid tank 22, as explained later.

As exemplified in FIG. 2, a first outgoing light ray 42 propagates through gas without being refracted and impinges on the tank wall circumferential portion 40. A second outgoing light ray 44 initially propagates through gas evaporating from the cryogenic liquid 28, before entering the cryogenic liquid 28, thereby being refracted at the liquid surface 46 and subsequently propagating through the cryogenic liquid 28 towards another tank wall circumferential portion 40.

The first and second outgoing light rays 42, 44 are backscattered from the tank wall circumferential portion 40, each forming an incoming light ray 48.

The tank wall 24 may have an interior reflective coating that is arranged at the tank wall circumferential portions 40, so as to improve backscattering. It is also possible that the tank wall 24 is structured so as to favor backscattering of the outgoing light rays 34. An example for a suitable structure is a reflective grating.

The light conducting device 36 may further comprise an input member 50. Similarly to the output member 38, the input member 50 may include optical elements. The output member 38 and the input member 50 need not necessarily be separate units, they may be integrated into a single unit and designated input/output member.

The input member 50 preferably receives the incoming light rays 48 and couples the incoming light rays 48 into a single bidirectional light conductor 52 of the light conducting device 36. It should be noted that the bidirectional light conductor 52 is also optically coupled to the light source 32, so as to conduct the outgoing light rays 34 from the light source 32 towards the tank volume 26. It is further noted, that incoming and outgoing light rays 34, 48 may be conducted within a separate outgoing light conductor and incoming light conductor, respectively, of the light conducting device 36.

The optical level gauge apparatus 30 further comprises a sensor device 54. The sensor device 54 is optically coupled to the light conducting device 36, so as to be able to receive the incoming light rays 48. The sensor device 54 comprises a plurality of optical sensors 56. The optical sensors 56 may be individual sensors, such as photodiodes, phototransistors, etc., or may be integrated into an optical chip, such as a CCD-chip or other imaging chip.

The light conducting device 36 is optically coupled to the sensor device 54 in a manner so that each optical sensor 56 corresponds to a specific tank wall portion 58. This may, for example, be achieved by individually routing optical fibres of the light conducting device 36 towards each optical sensor 56.

The sensor device 54 is configured to output measured light values that are indicative of the amount of light being detected by each optical sensor 56. The measured light values can be processed further by a data processing device, such as a microcontroller, microprocessor or other computing device.

The optical level gauge apparatus 30 further comprises a liquid level determining device 60. The liquid level determining device 60 is configured to process the output of the sensor device 54 using signal processing techniques, that are known per se. After processing, the liquid level determining device 60 outputs a liquid level value, that is indicative of the liquid level L within the tank volume 26. The liquid level determining device 60 may be realized by a suitable data processing device, such as a microcontroller or microprocessor, an embedded system or by a general-purpose computer.

Figure 3:
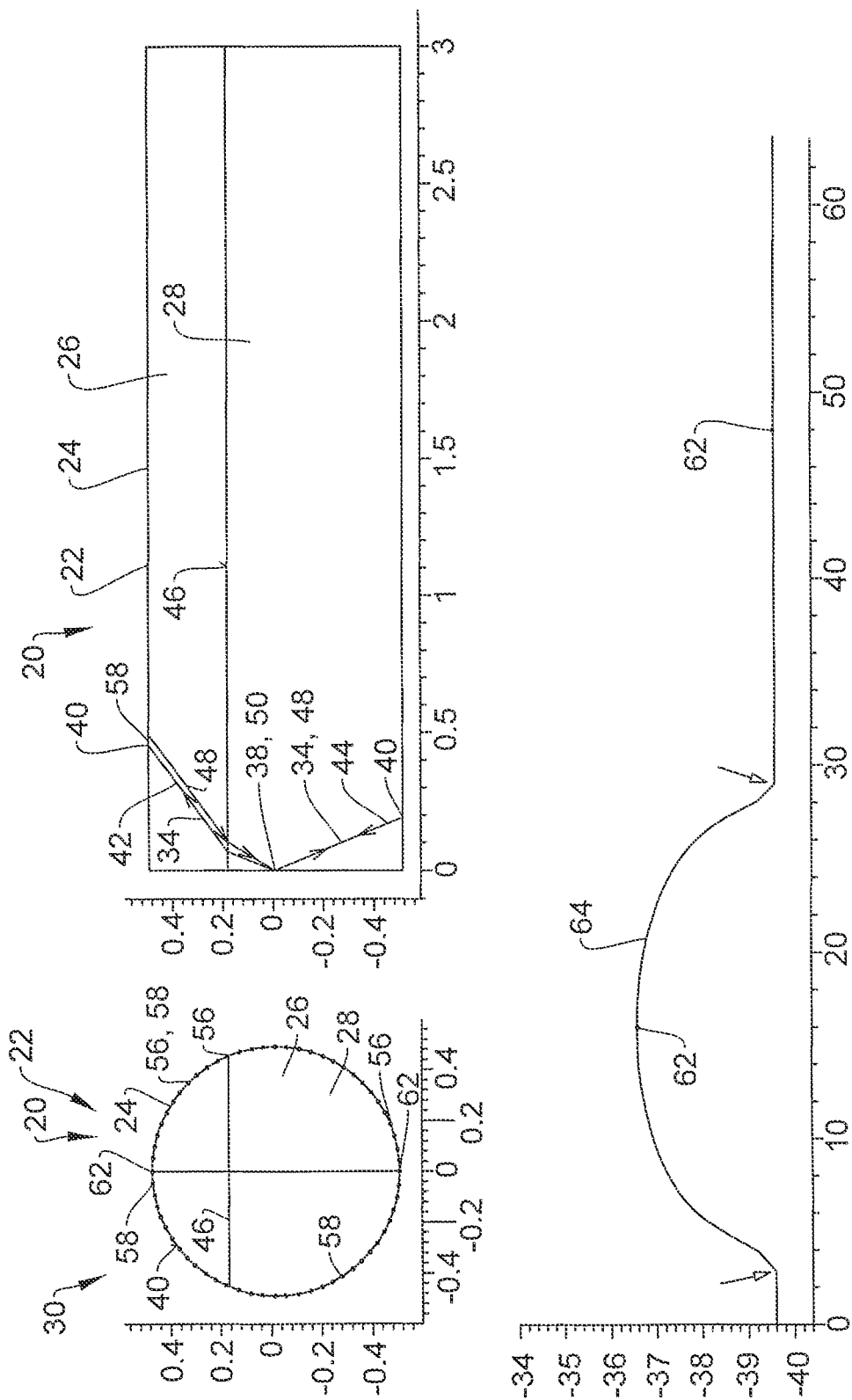
FIG. 3 depicts diagrams illustrating the measurement principle of one method for determining a liquid level.

Referring now FIG. 3, a measurement principle that allows the liquid level determining device 60 to determine the liquid level L within the tank volume 26 is described in more detail.

FIG. 3, top left diagram, depicts a schematic view of the liquid tank 22 along its axial direction, i.e., its longitudinal axis. Furthermore, this diagram depicts the plurality of specific tank wall portions 58 that are distributed along the circumferential direction of the liquid tank 22 with an equal distance to each other. Each specific tank wall portion 58 corresponds to exactly one optical sensor 56. The diagram also depicts the liquid level L and two of the specific tank wall portions 58 as reference points 62, in order to facilitate the explanation.

FIG. 3, top right diagram, depicts a schematic longitudinal cross section of the liquid tank 22. The outgoing and incoming light rays 34, 48 are depicted. It should be noted that the angle of refraction is greatly exaggerated in order to facilitate understanding of the measurement principle.

FIG. 3, bottom diagram, depicts on the x-axis the sensor index, i.e. the number of the optical sensor 56 counted from a starting point. The y-axis depicts the attenuation of the incoming light ray 48 in a decibel scale. The baseline for this scale is for example given by the outgoing light ray 34. As a result, points further along the y-axis designate a smaller attenuation than points closer to the x-axis.

As shown in FIG. 3, the more the outgoing and incoming light rays 34, 48 propagate through the cryogenic liquid 28, the higher the attenuation value. This results in the attenuation curve 64 shown in FIG. 3, bottom diagram.

The liquid level L can be determined by determining the sensor index of the optical sensors 56 which begin to show less attenuation, as indicated by the arrows in FIG. 3, bottom diagram. Since the specific tank wall portions 58 are uniquely related with the optical sensors 56 and the position of the specific tank wall portion 58 and the geometry of the tank volume 26 are known, the liquid level determining device 60 is able to calculate the position of the liquid surface 46 and hence determine the liquid level L in the tank volume 26.

Figure 4:
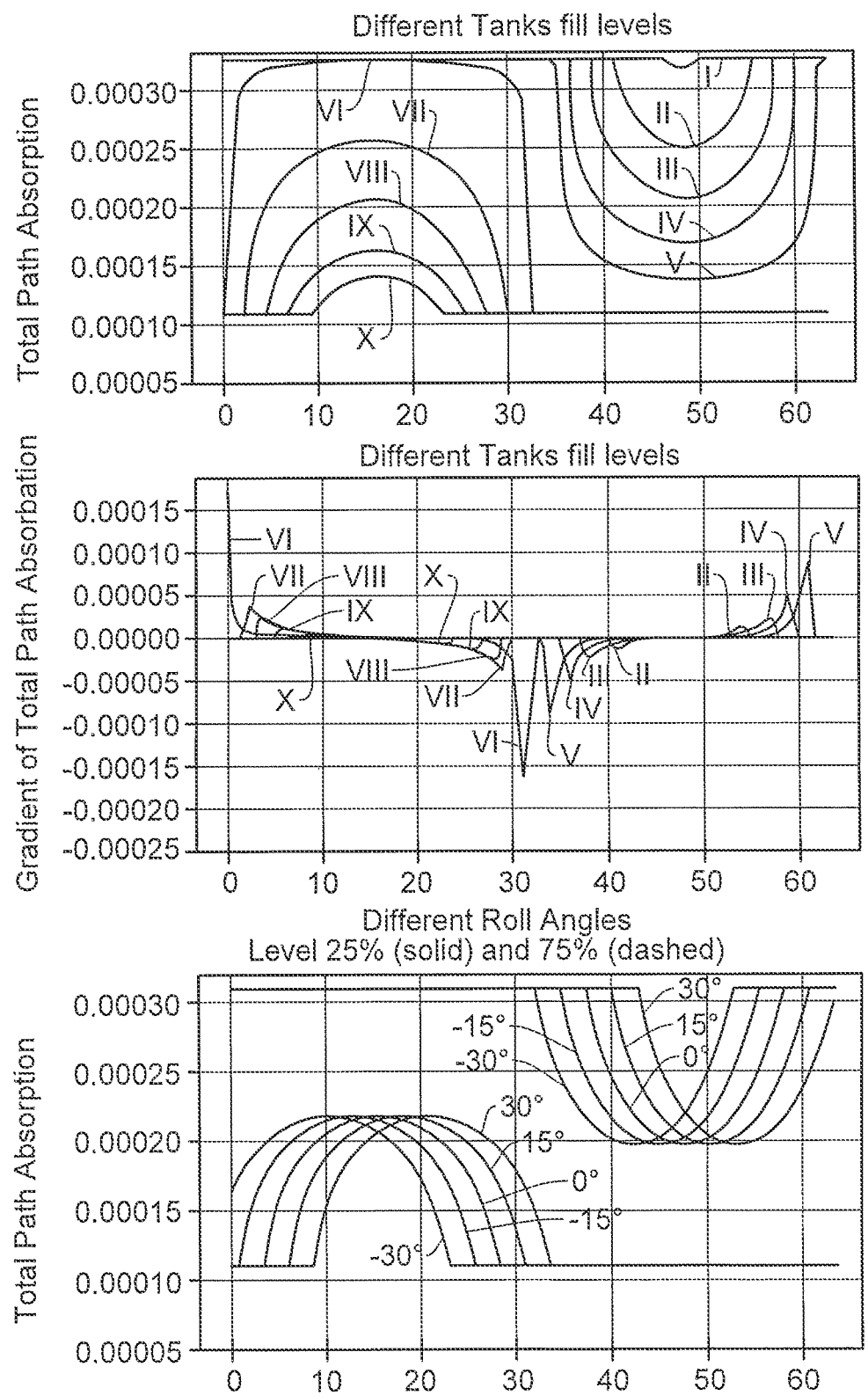
FIG. 4 depicts diagrams illustrating the measured values.

FIG. 4, top diagram, depicts the total path absorption, i.e., an absorption value, depending on the sensor index of the optical sensor 56. The total path absorption is shown in linear scale. Hence, points further along the y-axis designate a larger total path absorption than points closer to the x-axis, resulting in the absorption curves 65 for different fill levels I, II, . . . , X of the tank volume 26. Fill levels I, II, . . . , V are below 50% fill level, while VI, VII, . . . , X are above 50% fill level. The light conducting device 36 is arranged at the 50% level.

FIG. 4, middle diagram, depicts the gradient of the total path absorption depicted in FIG. 4, top diagram. With this it is easier to detect the sensor index, at which the absorption value increases/decreases so that the liquid level L may be determined more precisely.

FIG. 4, bottom diagram, depicts absorption curves 65 for different degrees 0°, ±15°, ±30° of rotation of the liquid tank 22 about its longitudinal axis, i.e. if the aircraft 10 rolls. As illustrated, all absorption curves 65 reach the same maximum, however the sensor index of the optical sensors 56 at which the respective absorption curve 65 begins to increase/decrease changes depending on the angle of rotation about the longitudinal axis.

Figure 5:
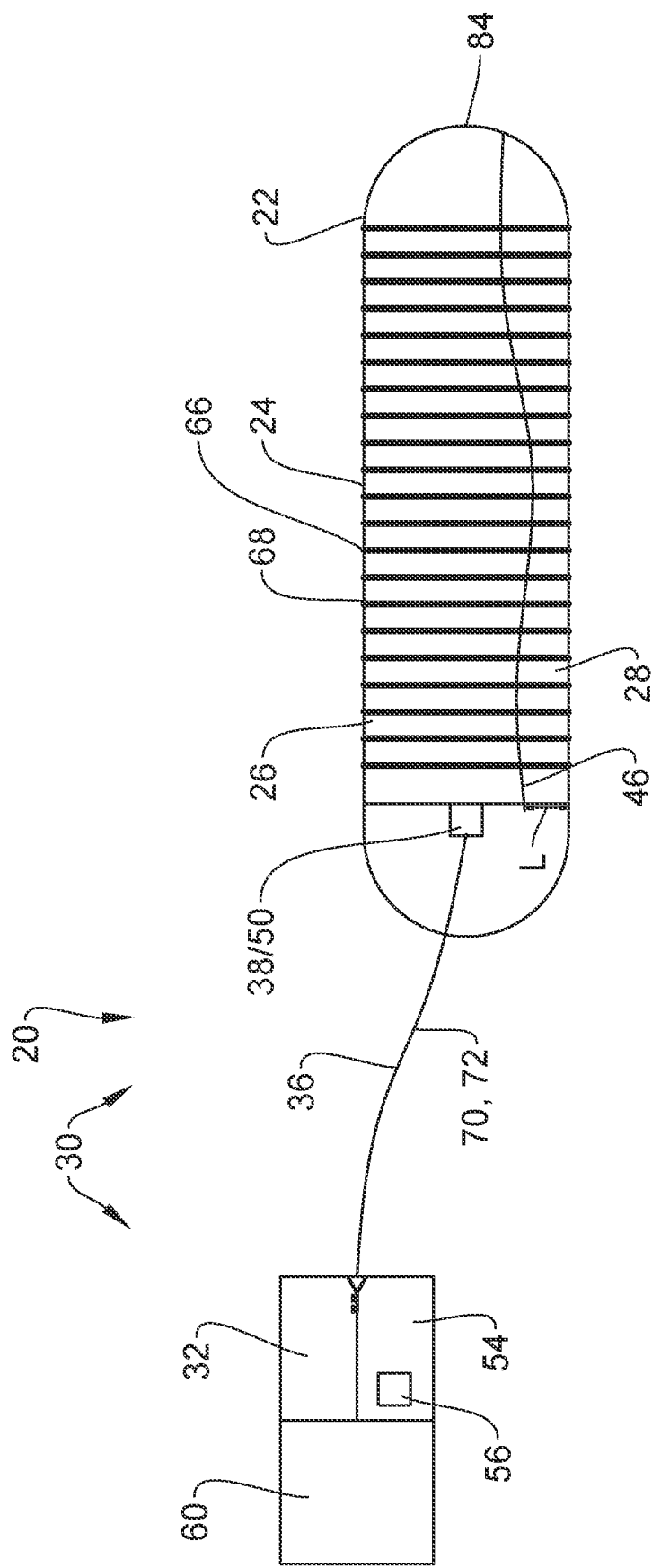
FIG. 5 depicts another embodiment of a tank.

FIG. 5 depicts another embodiment of a liquid tank assembly 20. This embodiment is described only insofar as it differs from the embodiment previously described.

The optical level gauge apparatus 30 comprises a light source 32 that is capable of emitting a plurality of wavelengths, specifically two or more discrete wavelengths, or a continuous spectrum such as white light. The light source 32 may be configured as a laser source.

The light conducting device 36 is configured as an imaging light conducting device that allows imaging the tank volume 26 by a corresponding sensor device 54.

The output member 38 may be configured to output the outgoing light rays 34 so as to form a pattern arrangement 66. The pattern arrangement 66 is projected onto the inner surface of the tank wall 24 and may be comprised of axial and circumferential stripes as exemplified in FIG. 6 to FIG. 8.

The light source 32 may be optically coupled to the tank volume 26 by the light conducting device 36 such that the tank wall 24 may be illuminated. It is also possible that the tank wall 24 has the pattern arrangement 66 formed thereon. Furthermore, the tank wall 24 may comprise at least one anti-sloshing baffle 68 and the pattern arrangement 66 is disposed on or projected onto the anti-sloshing baffle 68.

The input member 50 is configured such that an image of the tank volume 26 is passively conducted towards the sensor device 54, including backscattered or backreflected incoming light rays 48.

In this embodiment, the light conducting device 36 preferably comprises an outgoing light conductor 70 that is optically connected to the light source 32 and the output member 38 and conducts the outgoing light rays 34 from the light source 32 into the tank volume 26.

Preferably the light conducting device 36 also comprises an incoming light conductor 72 that is configured as an imaging light conductor. The input member 50 may include optical elements that improve or facilitate imaging of the tank volume 26. The input member 50 is optically connected to the incoming light conductor 72, which in turn is connected to the optical sensor 56 of the sensor device 54. In this embodiment the optical sensors 56 form an imaging sensor, and the sensor device 54 is configured to output image data.

The liquid level determining device 60 includes a computer vision algorithm for evaluating the image data detected by the sensor device 54 and may specifically search and determine distortions due to refraction or color changes of the pattern arrangement 66 in view of the liquid surface 46. It is possible to dye the liquid in the liquid tank 22 in order to improve contrast and measurement reliability. Through, for example, edge detection algorithms, and other computer vision algorithms that are known in a manner per se, the pattern arrangement 66 can be analyzed and compared to the pattern arrangement 66 in a reference setup. By comparing the measured and the reference pattern arrangement 66, the liquid level L can be determined.

In addition to determining the liquid level L, this embodiment may also be used to inspect the tank volume 26 for defects by illuminating the tank wall 26 and imaging the tank wall 26 using the sensor device 54. Again, computer vision algorithms may be used to detect leaks or other defects.

Figure 6:
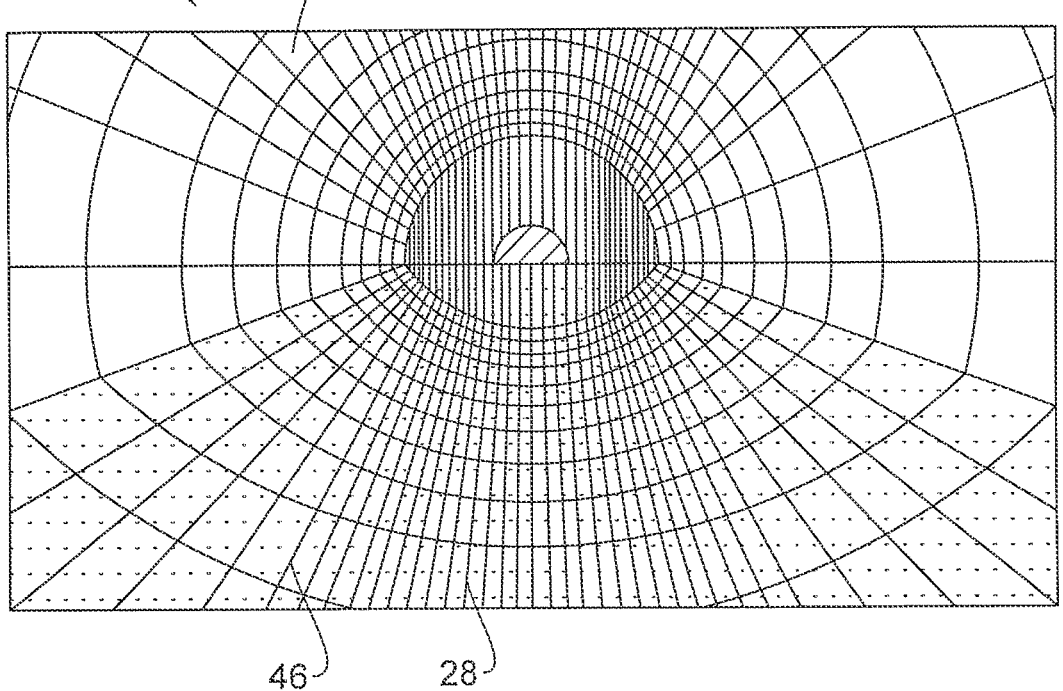
FIGS. 6 and 7 depict images of tank volume.

FIG. 6 exemplifies the image of the tank volume 26, when the liquid tank assembly 20 is about half filled and in a neutral position, i.e., the liquid tank 22 is horizontally aligned.

Figure 7:
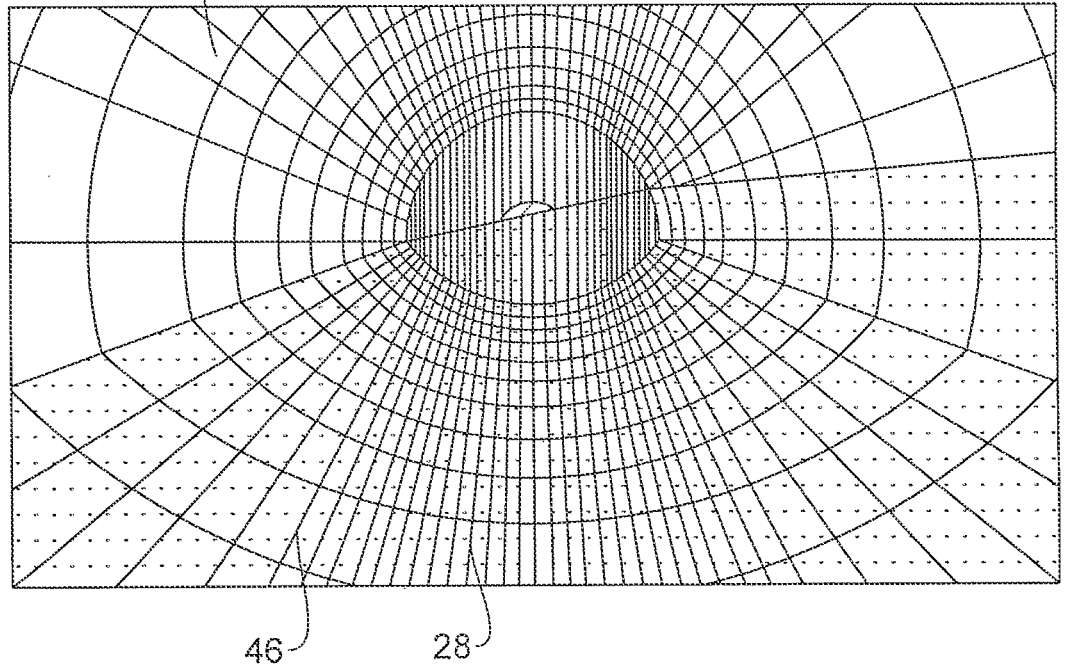

FIG. 7 depicts a similar situation, in which the liquid tank assembly 20 is aligned horizontally, however, the liquid tank 22 is rolled about its longitudinal axis.

Figure 8:
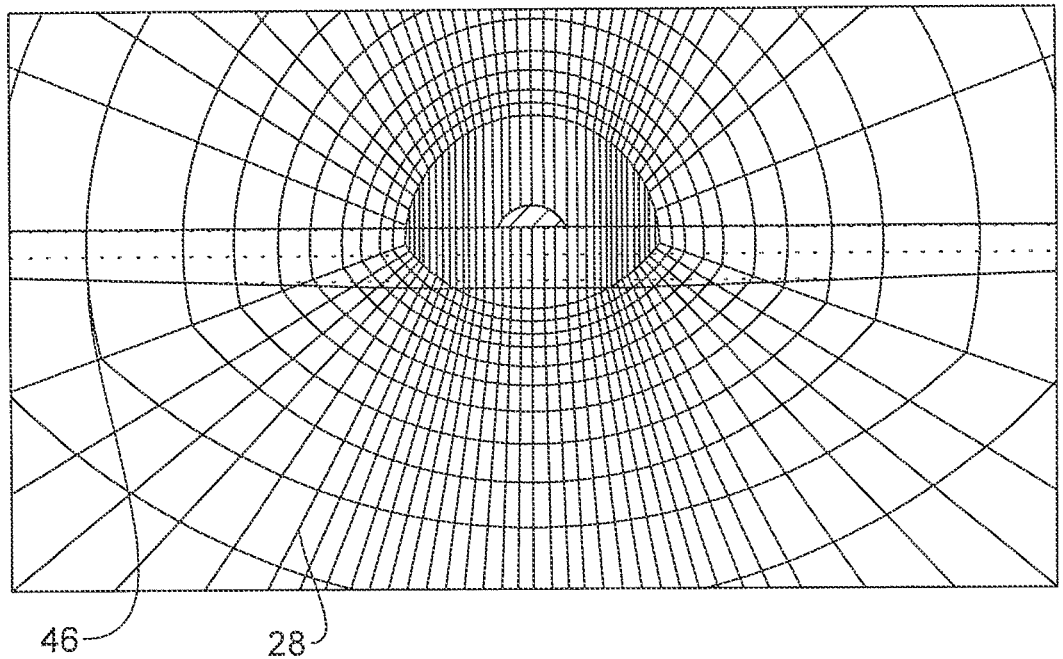
FIG. 8 depicts a schematic inside view of the tank of FIG. 5.

FIG. 8 depicts a situation, in which the aircraft 10 and consequently the liquid tank assembly 20 are pitched.

The image of the pattern arrangement 66 changes depending on the current situation, so that as a result not only the liquid level L, but also pitching and rolling can be detected.

Figure 9:
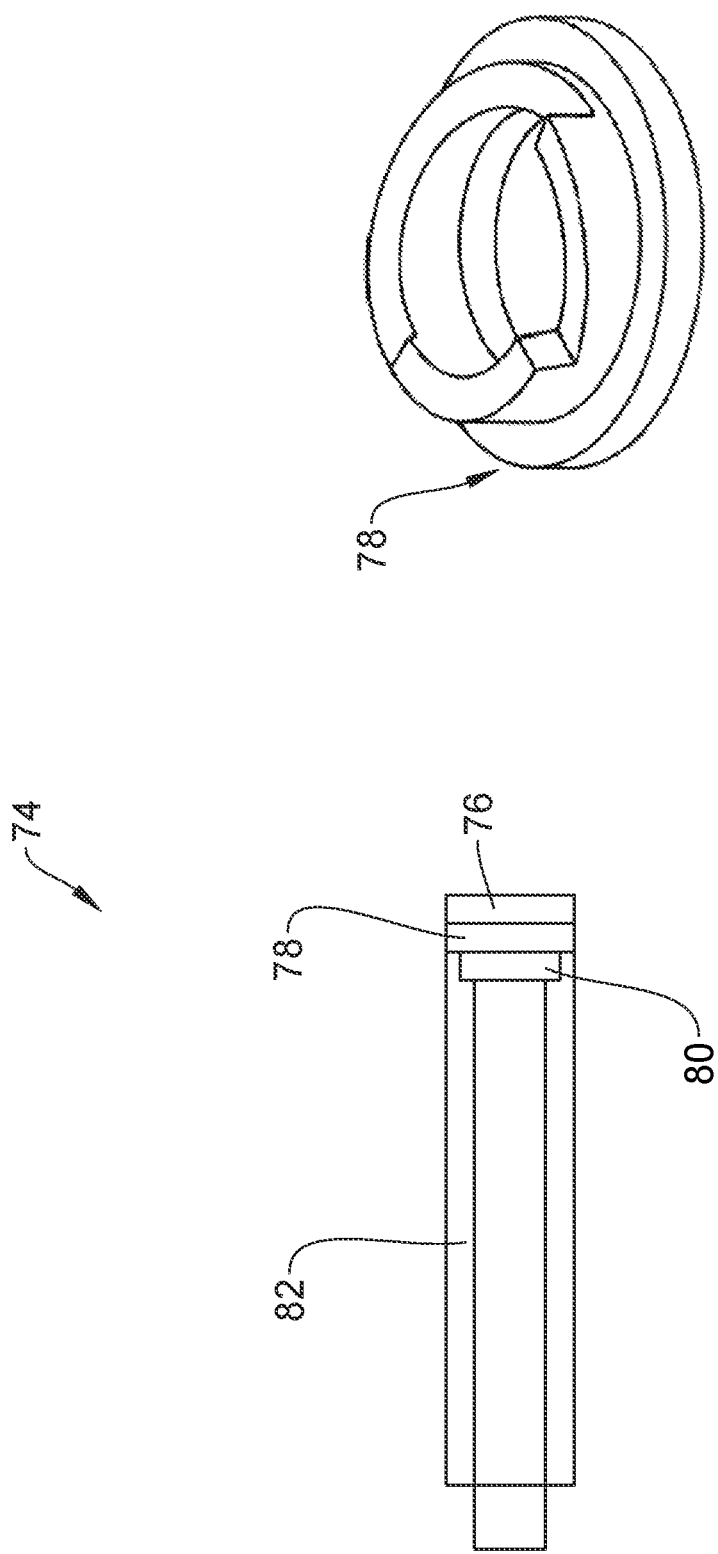
FIG. 9 depicts an optical coupler.

FIG. 9 depicts an embodiment of an optical coupler assembly 74. The optical coupler assembly comprises an optical window 76 that may be attached to or integrated into the tank wall 24, preferably at a position, which allows the sensor device 45 to image a large portion of the tank volume 26. The optical coupler assembly 74 comprises an alignment flange 78, that is configured such that the light conducting device 36, specifically the input/output member can only be inserted in a manner, that allows meaningful imaging of the tank volume 26. The light conducting device 36 may comprise an alignment ring 80 that matches the alignment flange 78. In addition, it is possible that the alignment flange 78 and the alignment ring 80 are configured such that they magnetically interact and hold firm the light conducting device 36. Still the light conducting device 36 can be removed easily by a technician through exerting a reasonable amount of pull force. The optical coupler assembly 74 may further comprise a feedthrough guiding tube 82 that feeds the light conducting device 36 into the liquid tank 22 close to the tank volume 26, such that the optical level gauge apparatus can perform its function.

Referring to FIG. 10 through FIG. 13, another measurement principle is explained in more detail, which utilizes the imaging capability of the optical level gauge apparatus 30.

Figure 10:
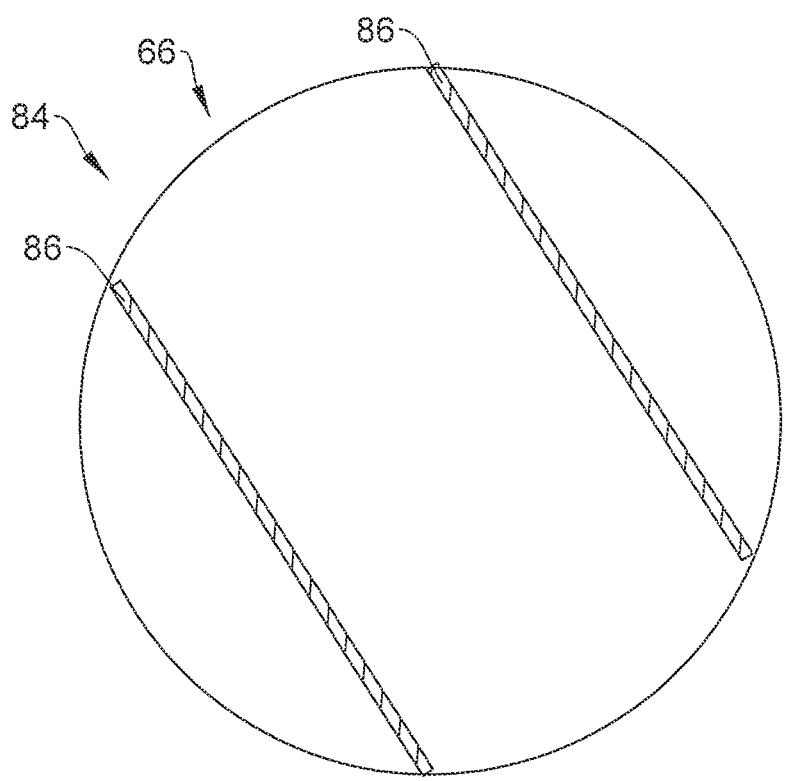
FIGS. 10 through 12 depict schematically a tank wall portion.

FIG. 10 depicts schematically a tank wall portion 84 that is arranged opposite the light conducting device 36.

The tank wall portion 84 comprises the pattern arrangement 66, which in this instance is configured to include two parallel slanted stripes 86. The pattern arrangement 66 includes a reflective material, that upon being illuminated by the light source 38 reflects the outgoing light rays 34 as incoming light rays 48 back towards the light conducting device 36 along the longitudinal axis of the tank 22. FIG. 10 shows the stripes without being illuminated. The back reflection may be diffuse or specular, whereas the latter case may be realized by reflection gratings.

Figure 11:
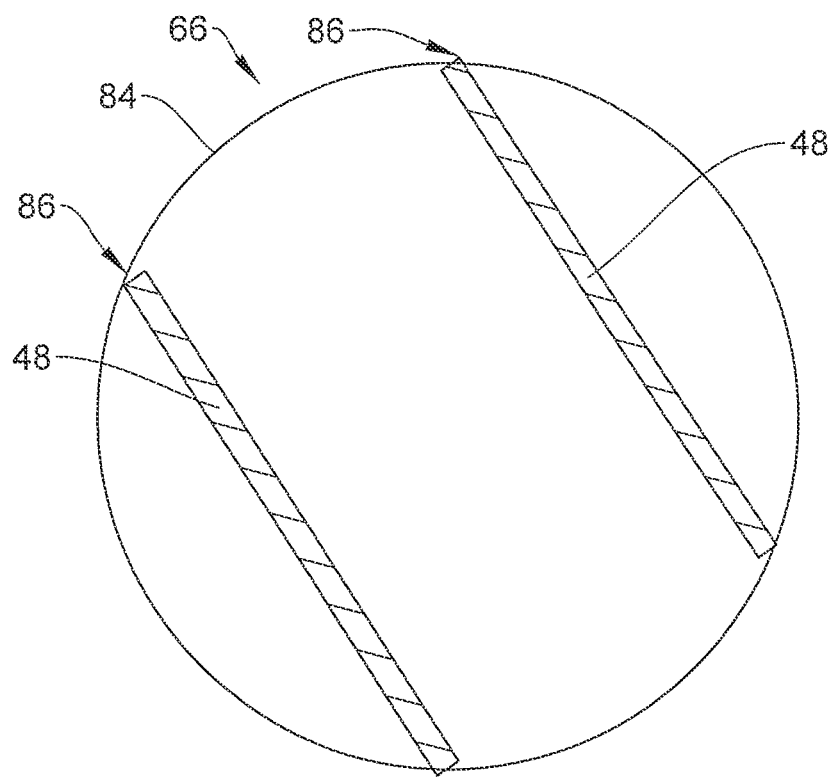

FIG. 11 illustrates the tank volume 26 being completely filled, wherein the pattern arrangement 66 is illuminated by the light source 32 and the reflected incoming light rays 48 are detected by the sensor device 54.

Figure 12:
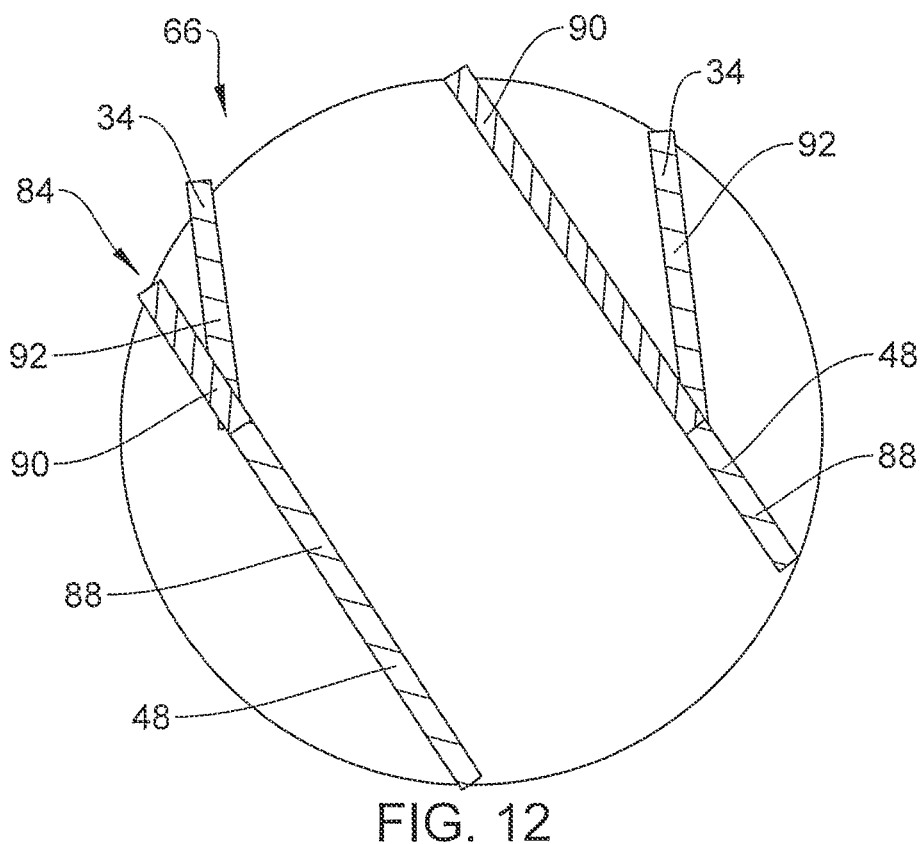
Figure 13:
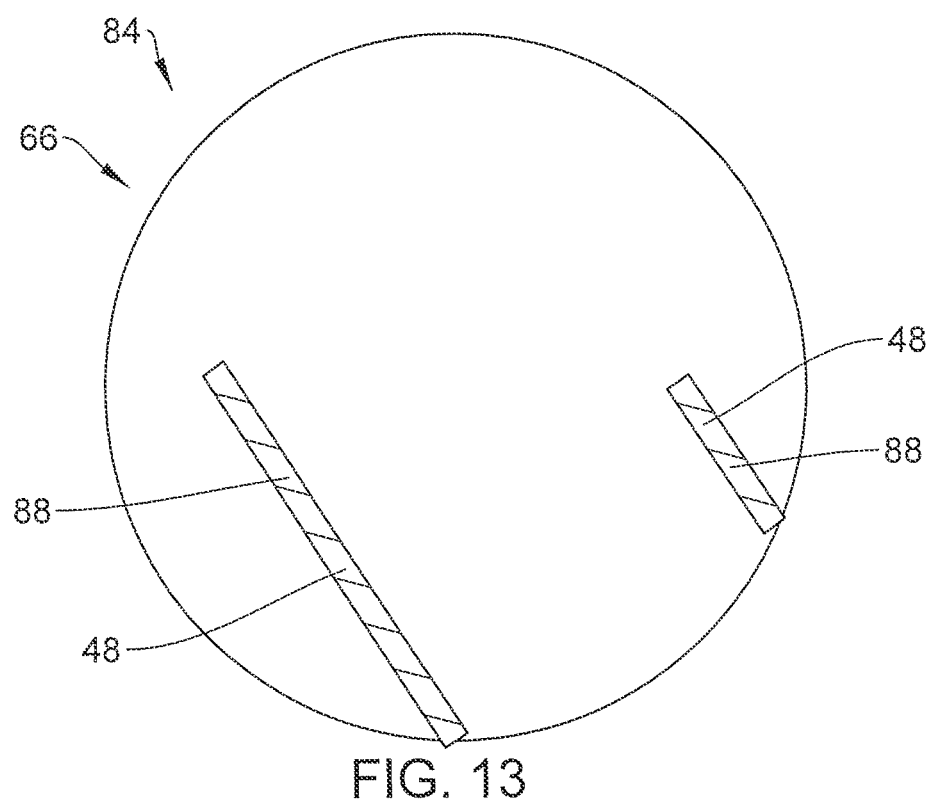
FIG. 13 depicts another measurement principle.

FIG. 12 and FIG. 13 illustrate what happens when the liquid level L drops.

FIG. 12 depicts the positions of the outgoing light rays 34. Due to the propagation within the cryogenic liquid 28, the outgoing light rays 34 illuminate the pattern arrangement 66 in a bottom section 88 below the liquid level L. Due to refraction at the liquid surface 46, however, the outgoing light rays 34 failed to illuminate the pattern arrangement 66 in a top section 90 and are instead hitting a tank wall section 92 next to the pattern arrangement 66.

FIG. 13 illustrates the actual image, that would be recorded by the sensor device 54 in this case. Only the bottom section 88 is visible, and the liquid level L can be directly read of the illuminated pattern arrangement 66.

In order to improve liquid level gauging inside liquid tanks, especially cryogenic liquid tanks, the disclosure herein provides an apparatus and method for determining the liquid level L. In light source emits outgoing light rays 34 that are back reflected by the tank wall 24 of the liquid tank 22. The back reflected incoming light rays are received by a light conducting device 36, which conducts the incoming light rays 48 towards a sensor device 54. The sensor device 54 has optical sensors 56 that are coupled to the light conducting device 36 in such a manner that there is a one-two-one relationship between each optical sensor 56 and a specific tank wall portion 58. Due to the change in the amount of light that is received by the optical sensor 56 after the outgoing light rays 34 were refracted by the liquid surface 46, the liquid level determining device 60 is capable of determining the liquid level L.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 tail plane section
18 engine
20 liquid tank assembly
22 liquid tank
24 tank wall 26 tank volume
28 cryogenic liquid
30 optical level gauge apparatus
32 light source
34 outgoing light ray
36 light conducting device
38 output member
40 tank wall circumferential portion
42 first outgoing light ray
44 second outgoing light ray
46 liquid surface
48 incoming light ray
50 input member
52 bidirectional light conductor
54 sensor device
56 optical sensor
58 specific tank wall portion
60 liquid level determining device
62 reference point
64 attenuation curve
65 absorption curve
66 pattern arrangement
68 anti-sloshing baffles
70 outgoing light conductor
72 incoming light conductor
74 optical coupler assembly
76 optical window
78 alignment flange
80 alignment ring
82 feedthrough guiding tube
84 tank wall portion
86 stripe
88 bottom section
90 top section
92 tank wall section
L liquid level
$\lambda_1, \lambda_2$ wavelength

The invention claimed is:

1. An optical level gauge apparatus configured for gauging a liquid level in a tank volume defined by a tank wall of a tank, the apparatus comprising:
  a light source;
  a sensor device having a plurality of optical sensors that form an imaging sensor, wherein each of the optical sensors is configured for detecting an amount of light, wherein the sensor device is configured to:
    output a plurality of measured light values that are indicative of the amount of light detected by a respective optical sensor of the plurality of optical sensors; and
    output the measured light values as image data;
  a light conductor configured for optical coupling to the light source, the sensor device, and the tank volume, wherein:
    when the light conductor is optically coupled to the light source, the sensor device, and the tank volume, the light conductor is configured to conduct outgoing light rays from the light source to the tank volume and to conduct incoming light rays, reflected or scattered at least once within the tank volume, from the tank volume to the sensor device, wherein the incoming light rays are conducted such that each of the plurality of optical sensors corresponds to a specific portion of the tank wall; and
    the light conductor is configured as an imaging light conductor capable of conducting the incoming light rays such that the sensor device can image the tank volume;
  a liquid level determining device configured for determining the liquid level by processing the image data; and
  a pattern arrangement that is arrangeable within or projectable into the tank volume, wherein the incoming light rays are caused by the pattern arrangement.

2. The apparatus of claim 1, wherein:
  the light source is configured to emit one of:
    multi-color light having a plurality of discretely separated wavelengths;
    visible white light; and
    single wavelength light having visible, ultraviolet or infrared wavelength; and/or
  the light source comprises a laser source.

3. The apparatus of claim 1, wherein:
  the light conductor comprises an optical output member configured to output the outgoing light rays with a light ray pattern such that, when optically coupled to the tank volume, the outgoing light rays can impinge on a tank wall circumferential portion of the tank wall; and
  the light conductor comprises an optical input member that, when optically coupled to the tank volume, is configured to receive the incoming light rays after the incoming light rays have been reflected or scattered by the tank wall circumferential portion at least once.

4. The apparatus of claim 3, wherein the optical input member is configured to receive the incoming light rays after the incoming light rays are reflected or scattered by the tank wall circumferential portion and are subsequently or previously refracted by a liquid surface in the tank volume.

5. The apparatus of claim 1, wherein:
  the light conductor includes an outgoing light conductor and an incoming light conductor;
  the outgoing light conductor is configured for conducting light emitted by the light source towards the tank volume; and
  the incoming light conductor is configured for conducting light received from the tank volume to the sensor device.

6. The apparatus of claim 1, wherein the light conductor is configured to conduct the incoming light rays such that:
  specific portions of the incoming light rays are distributed along a circumferential direction of the tank wall; and/or
  a first specific portion and a second specific portion that neighbor each other along the circumferential direction of the tank wall are distanced along a longitudinal direction of the tank volume due to a light ray that is received from the first specific portion being refracted by a liquid level in the tank volume while another light ray that is received from the second specific portion is not refracted by the liquid level.

7. The apparatus of claim 6, wherein the light conductor is configured to conduct the incoming light rays such that a first group of the specific portions and a second group of the specific portions are each distributed along the circumferential direction of the tank wall and are distanced along the longitudinal direction to allow measuring a tilt of the tank about a tank tilt axis that is perpendicular to the longitudinal direction.

8. The apparatus of claim 6, wherein the light conductor is configured to conduct the incoming light rays such that a first group of the specific portions and a second group of the specific portions are each equidistantly distributed along the circumferential direction of the tank wall and are distanced along the longitudinal direction to allow measuring a tilt of the tank about a tank tilt axis that is perpendicular to the longitudinal direction.

9. The apparatus of claim 1, wherein:
the pattern arrangement is configured to:
absorb a first wavelength emitted by the light source; and
emit a second wavelength that is different from the first wavelength; and
the sensor device is configured to detect the second wavelength, but not the first wavelength;
and/or
wherein the pattern arrangement is illuminatable or projectable by the outgoing light rays, such that the incoming light rays are only generated for portions of the pattern arrangement that are below the liquid level.

10. The apparatus of claim 1, wherein:
the light source is tunable in wavelength; and/or
the sensor device has a spectrometer or spectral camera that is respectively formed by the optical sensors, wherein the sensor device is configured to output the measured light values as spectral data or spectral image data, respectively, and wherein the liquid level determining device is configured to control the light source to emit at a measurement wavelength, which is determined from the spectral data or the spectral image data and allows an increase of a signal-to-noise ratio.

11. A liquid tank assembly for a vehicle, or an aircraft, the liquid tank assembly comprising:
a tank having a tank wall defining a tank volume for storing a liquid; and
the optical level gauge apparatus of claim 1;
wherein the light conductor is optically coupled to the tank volume.

12. A vehicle comprising the optical level gauge apparatus of claim 1.

13. The apparatus of claim 1, wherein the light conductor comprises a bidirectional light conductor configured for conducting the outgoing light rays to the tank volume and the incoming light rays from the tank volume.

14. The apparatus of claim 1, wherein the light conductor is configured to conduct the incoming light rays such that:
specific portions of the incoming light rays are equidistantly distributed along a circumferential direction of the tank wall; and/or
a first specific portion and a second specific portion that neighbor each other along the circumferential direction of the tank wall are distanced along a longitudinal direction of the tank volume due to a light ray that is received from the first specific portion being refracted by a liquid level in the tank volume while another light ray that is received from the second specific portion is not refracted by the liquid level.

15. The apparatus of claim 14, wherein the light conductor is configured to conduct the incoming light rays such that a first group of the specific portions and a second group of the specific portions are each distributed along the circumferential direction of the tank wall and are distanced along the longitudinal direction to allow measuring a tilt of the tank about a tank tilt axis that is perpendicular to the longitudinal direction.

16. The apparatus of claim 14, wherein the light conductor is configured to conduct the incoming light rays such that a first group of the specific portions and a second group of the specific portions are each equidistantly distributed along the circumferential direction of the tank wall and are distanced along the longitudinal direction to allow measuring a tilt of the tank about a tank tilt axis that is perpendicular to the longitudinal direction.

17. A cryogenic liquid tank assembly for a vehicle, the cryogenic liquid tank assembly comprising:
a tank having a tank wall defining a tank volume for storing a liquid; and
the optical level gauge apparatus of claim 1;
wherein the light conductor is optically coupled to the tank volume.

18. An aircraft comprising the optical level gauge apparatus of claim 1.

19. A liquid tank assembly for an aircraft, the liquid tank assembly comprising:
a tank having a tank wall defining a tank volume for storing a liquid; and
the optical level gauge apparatus of claim 1;
wherein the light conductor is optically coupled to the tank volume.

20. A cryogenic liquid tank assembly for an aircraft, the cryogenic liquid tank assembly comprising:
a tank having a tank wall defining a tank volume for storing a liquid; and
the optical level gauge apparatus of claim 1;
wherein the light conductor is optically coupled to the tank volume.

* * * * *